United States Patent Office 2,988,533
Patented June 13, 1961

2,988,533
REACTION PRODUCTS OF SULFUR DICHLORIDE WITH 6-ALKYL-2,2,4-TRIMETHYL-1,2-DIHYDROQUINOLINES AND THEIR USE AS ANTIOXIDANTS IN RUBBER
Richard W. Kibler, Cuyahoga Falls, Ohio, assignor to The Firestone Tire & Rubber Company, Akron, Ohio, a corporation of Ohio
No Drawing. Filed July 24, 1959, Ser. No. 829,196
15 Claims. (Cl. 260—45.8)

This invention relates to antioxidants for use in rubber. The antioxidants are friable sulfur-dichloride reaction products of 6-alkyl-2,2,4-trimethyl-1,2-dihydroquinolines in which the alkyl substituent contains 6 to substantially 20 carbon atoms, the upper limit being only a question of expediency. Such compounds will be referred to herein as 6-ATDHQ's. The sulfur content of these reaction products runs between about 5 and 20 percent.

Certain 6-ATDHQ's are known to be most valuable antioxidants in their field, but are little used because they are liquid. Commercial compounders usually prefer solid chemicals wherever possible because liquids are difficult to handle in commercial compounding. The products of this invention being solid, are preferred to the liquids from which they are derived. Likewise, they are less volatile by themselves and also when compounded in rubber, and this is an advantage as when in service the rubber is subjected to a high temperature or a stream of hot air. Furthermore, their rate of migration in rubber is advantageously lower than that of the liquids from which they are derived.

According to this invention, 6-ATDHQ's are converted to sulfides by reaction with sulfur dichloride. The resulting reaction products which have a mono-sulfide linkage are quite stable and little or none of the sulfur is made available for curing when used in rubber compounding. During the reaction HCl is liberated and if a neutralizing agent, such as NaOH, is present, 6-ATDHQ sulfide products are formed which are substantially free of HCl. Any suitable neutralizing agent can be used, including KOH, Ca(OH)$_2$, other alkali hydroxides, alkaline carbonates and bicarbonates, ammonia, strong amines etc. The sulfides are immiscible with water, so neutralization takes place with an aqueous solution of the neutralizing agent, in a two-phase system, and the HCl salt formed is soluble in the water phase and easily removed. If no neutralizing agent is used, the reaction is a one-phase reaction and the 6-ATDHQ sulfide contains some hydrogen chloride salts. The invention includes the reaction products which are antioxidants, and their use in rubber.

In producing the reaction products, 2 moles of 6-ATDHQ are reacted with 1 to 4 moles of SCl$_2$. Using 1 mole of sulfur dichloride with 2 moles of 6-ATDHQ, the reaction product is almost entirely bis(6-ATDHQ) monosulfide, provided alkali is present to remove hydrogen chloride which is formed during the reaction. If a higher ratio of sulfur dichloride to 6-ATDHQ is used, carbon-carbon mono-sulfide linkages are formed as well as carbon-nitrogen mono-sulfide linkages. The amount of such other reaction products formed is increased as the ratio of SCl$_2$ is increased, and one mole of 6-ATDHQ may be linked to a second mole through its nitrogen group and to a third mole of 6-ATDHQ through a ring carbon. Thus chain and cyclic compounds may be produced.

The sulfur dichloride reaction products of the 6-ATDHQ's having larger alkyl groups of, for example, 12 or 18 carbon atoms, are less friable than the sulfur dichloride reaction products produced from 6-ATDHQ's containing smaller alkyl groups, at the same molar ratios.

Reaction products of sulfur dichloride and 6-alkyl-2,2,4-trimethyl-1,2-dihydroquinolines included herein are, for example, those in which the alkyl group is any of the following:

Hexyl  
Heptyl  
Octyl  
Nonyl  
Decyl  
Dodecyl, etc.

The various isomers are included.

Bis(6-ATDHQ) monosulfide presumably has the following formula:

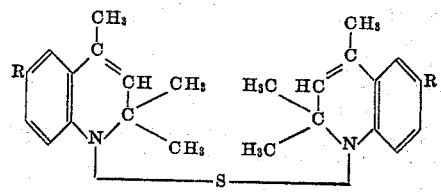

in which R is an alkyl group of 6 to 20 carbon atoms, and both R's may be the same or different.

The rubbers in which the antioxidants are useful are diene rubbers, namely the homopolymers and copolymers of conjugated dienes including butadiene-isoprene copolymer and the rubbers identified in ASTM designation: D1418–56T in the ASTM Journal for 1956 as BR, IR, CR, NR, ABR, IIR, NBR, NCR, PBR, SBR, SCR and SIR. The antioxidant is ordinarily present in the rubber during sulfur vulcanization or other cross linking.

The following examples illustrate the production of the reaction products:

The 6-ATDHQ's are preferably prepared starting with the appropriate alkyl benzene. This is nitrated and the para-nitro compound is reduced to the corresponding aromatic amine which is reacted with acetone, following the known procedure for the preparation of 6-alkyl-2,2,4-trimethyl-1,2-dihydroquinolines.

EXAMPLE I

Preparation of reaction product (no caustic)

6-hexyl-2,2,4-trimethyl-1,2-dihydroquinoline was used, and 51.4 grams (0.2 mole) was dissolved in 150 ml. of ethylene-dichloride in a 500 ml. 3-neck flask. 10.3 grams of SCl$_2$ (0.1 mole) was added dropwise with stirring. The temperature rose to 55–60° C., and the reaction mixture was stirred 15 minutes after the SCl$_2$ addition. The solvent was then stripped from the reaction mixture, the final stripping conditions being 0.5 hour at 150° C. and 25 mm. The reaction mixture was then poured out and cooled to a brittle solid which could be ground in a mortar. On analysis the reaction product was found to contain 6.8 percent sulfur and 6.0 percent chlorine.

EXAMPLE II

Preparation of reaction product (caustic present)

Using the same 6-ATDHQ, 51.4 g. (0.2 mole) was dissolved in 200 ml. benzene and the solution was placed in a 500 ml. 3-neck flask. The solution was stirred and 30.9 g. (0.3 mole) of $SCl_2$ was added dropwise. Simultaneously, 24 g. (0.6 mole) NaOH in 100 ml. water was added dropwise. The temperature reached 70° C. and the mixture was stirred for 20 minutes after the additions were complete. The benzene layer was then separated and washed with water. The benzene was then distilled until the final stripping conditions of 150° C. and 25 mm. were reached and held for 20 minutes. The hot liquid reaction mixture was then poured out. It cooled to a brittle solid which could be ground in a mortar. The reaction mixture analyzed for 16.3 percent sulfur.

Various antioxidant reaction products were produced using different 6-ATDHQ's having at least 6 and up to 20 carbon atoms in the alkyl group, and different molecular ratios thereof with $SCl_2$; and different inert solvents were used, e.g., n-hexane, n-heptane, $CCl_4$, toluene, xylene, etc. The reaction is preferably carried out at a temperature of 50 to 70° C. The foregoing examples are illustrative of the reactions. The reactions are summarized in the following two tables. Product I of Table I is based on Example I and product IV of Table II is based on Example II. The other products were made following those procedures. In the first table, reactions are described in which no caustic was employed, and the second table describes reactions in which caustic was employed; and the amount of water used is indicated. At the bottom of each table the reaction products are described, and the sulfur and chlorine contents are given for the reaction products obtained in the absence of alkali, and the sulfur contents for the reaction products obtained in alkaline reaction-mixtures. In obtaining the reaction products, each reaction mixture was subjected to solvent stripping for 30 minutes at 150° C. under 25 mm. pressure.

In the test data which follows, pertaining to the vulcanizates, each modulus and tensile strength at break is given in pounds per square inch and each elongation at break in percent. The 6-alkyl-2,2,4-trimethyl-1,2-dihydroquinolines having on the average six, twelve and eighteen carbon atoms in the respective alkyl groups are referred to in the following tables as 6-$C_6$ATDHQ, 6-$C_{12}$ATDHQ and 6-$C_{18}$ATDHQ, respectively.

The various products of the foregoing tables were tested in different rubber stocks. The physical properties of the various vulcanizates, both before and after aging, are recorded in the following tables. The test samples were obtained from the following masterbatch:

MASTERBATCH No. 1

| | Parts by weight |
|---|---|
| Hevea rubber | 100 |
| HAF black | 50 |
| Zinc oxide | 3 |
| Stearic acid | 2.6 |
| Softener | 3 |
| Retarder | 1 |
| Total | 159.6 |

In the various tests, the 6-ATDHQ from which each tested sulfide reaction product was produced was used as the control. In the following tables, the physical properties of the vulcanizates, both before and after aging are recorded. The different sulfide reaction products are designated by the numbers assigned to them in Tables I and II.

In each of the following tables, the stocks were cured at 280° F. for 20, 40 and 60 minutes. The properties of the vulcanizates after aging 2 days at 212° F. in a forced-draft oven, and also after aging 96 hours at 70° C. in an oxygen bomb, are given for comparison with the normal properties of the unaged stocks.

TABLE A

| Formula (Parts by weight) | Control | Sample No. 1 | Sample No. 2 |
|---|---|---|---|
| Masterbatch No. 1 | 159.6 | 159.6 | 159.6 |
| Sulfur | 2.6 | 2.6 | 2.6 |
| Accelerator | 0.5 | 0.5 | 0.5 |
| 6-$C_6$ATDHQ | 1.5 | 0.0 | 0.0 |
| Product I | 0.0 | 1.5 | 0.0 |
| Product IV | 0.0 | 0.0 | 1.5 |
| Total | 164.2 | 164.2 | 164.2 |

TABLE I (NO CAUSTIC)

| | Product I | Product II | Product III |
|---|---|---|---|
| Monosulfide of | 6-$C_6$ATDHQ—51.4 g. (0.2 mol). | 6-$C_{12}$ATDHQ—85 g. (0.25 mol). | 6-$C_{18}$ATDHQ—40.3 g. (0.1 mol). |
| $SCl_2$ | 10.3 g. (0.1 mol) | 25.75 g. (0.25 mol) | 15.5 g. (0.15 mol). |
| Solvent | $C_2H_4Cl_2$ (150 ml.) | $C_2H_4Cl_2$ (200 ml.) | $C_2H_4Cl_2$ (200 ml.). |
| Reaction temperature | 60° C | 60° C | 60° C. |
| Product description | Brittle solid, can be ground. | Brittle solid, can be ground. | Brittle solid, can be ground. |
| Percent Sulfur: | | | |
| Theory | 5.9 | 8.6 | 10.6. |
| Found | 6.8 | 10.3 | 13.8. |
| Percent Chlorine | 6.0 | 2.5 | 1.9. |

TABLE II (CAUSTIC PRESENT)

| | Product IV | Product V |
|---|---|---|
| Monosulfide of | 6-$C_6$ATDHQ—51.4 g. (0.2 mole). | 6-$C_{12}$ATDHQ—85 g. (0.25 mole). |
| $SCl_2$ | 30.9 g. (0.3 mole) | 51 g. (0.5 mole). |
| NaOH | 24 g. (0.6 mole) | 40 g. (1.0 mole). |
| Water | 100 ml | 150 ml. |
| Solvent | Benzene (200 ml.) | Benzene (200 ml.). |
| Reaction temperature | 70° C | 70° C. |
| Product Description | Brittle solid, can be ground. | Brittle solid, can be ground. |
| Percent Sulfur: | | |
| Theory | 15.7 | 15.7. |
| Found | 16.3 | 16.5. |

NORMAL PROPERTIES

| | | | |
|---|---|---|---|
| 300% Modulus: | | | |
| 20 min | 1,325 | 1,100 | 1,350 |
| 40 min | 2,000 | 1,800 | 1,950 |
| 60 min | 2,150 | 1,975 | 2,100 |
| 400% Modulus: | | | |
| 20 min | 2,175 | 1,850 | 2,150 |
| 40 min | 3,000 | 2,700 | 2,950 |
| 60 min | 3,250 | 3,000 | 3,050 |
| Tensile at break: | | | |
| 20 min | 3,625 | 3,150 | 3,750 |
| 40 min | 4,175 | 3,925 | 4,125 |
| 60 min | 3,900 | 3,900 | 4,000 |
| Elongation at break: | | | |
| 20 min | 590 | 570 | 610 |
| 40 min | 550 | 550 | 540 |
| 60 min | 470 | 520 | 510 |

PROPERTIES AFTER 2-DAY AGING AT 212° F.

| 300% Modulus: | | | |
|---|---|---|---|
| 20 min | 2,325 | 2,100 | 2,150 |
| 40 min | 2,400 | 2,225 | 2,300 |
| 60 min | | | |
| Tensile at break: | | | |
| 20 min | 2,550 | 2,575 | 2,875 |
| 40 min | 2,400 | 2,475 | 2,650 |
| 60 min | 2,000 | 2,150 | 2,000 |
| Elongation at break: | | | |
| 20 min | 330 | 360 | 390 |
| 40 min | 300 | 330 | 360 |
| 60 min | 270 | 270 | 270 |

PROPERTIES AFTER 96 HRS. IN BOMB AT 70° C.

| 300% Modulus: | | | |
|---|---|---|---|
| 20 min | 1,050 | 4,125 | 1,200 |
| 40 min | 1,525 | 1,600 | 1,650 |
| 60 min | 1,675 | 1,750 | 1,775 |
| 400% Modulus: | | | |
| 20 min | 1,600 | 1,750 | 1,875 |
| 40 min | 2,125 | 2,250 | 2,300 |
| 60 min | | 2,375 | 2,375 |
| Tensile at break: | | | |
| 20 min | 2,475 | 2,325 | 2,650 |
| 40 min | 2,275 | 2,800 | 2,775 |
| 60 min | 2,325 | 2,550 | 2,525 |
| Elongation at break: | | | |
| 20 min | 520 | 510 | 550 |
| 40 min | 480 | 500 | 480 |
| 60 min | 400 | 430 | 430 |

The results indicate that a solid derivative prepared from liquid 6-ATDHQ as herein described, does not depreciate the very excellent antioxidant activity of the liquid compound from which it is derived. It is more permanent in the rubber being less volatile and having a lower migratory rate.

The next table includes data on the sulfur-dichloride reaction product of the $C_{18}$ derivative identified in Table I as product III.

TABLE B

| Formula (Parts by weight) | Control | Sample No. 9 |
|---|---|---|
| Masterbatch No. 1 | 159.6 | 159.6 |
| Sulfur | 2.6 | 2.6 |
| Accelerator | 0.5 | 0.5 |
| 6-$C_{18}$ATDHQ | 1.5 | 0.0 |
| Product III | 0.0 | 1.5 |
| Total | 164.2 | 164.2 |

NORMAL PROPERTIES

| 300% Modulus: | | |
|---|---|---|
| 20 min | 1,200 | 1,300 |
| 40 min | 1,950 | 1,950 |
| 60 min | 2,125 | 2,100 |
| 400% Modulus: | | |
| 20 min | 1,950 | 2,075 |
| 40 min | 2,925 | 2,975 |
| 60 min | 3,100 | 2,950 |
| Tensile at break: | | |
| 20 min | 2,850 | 3,250 |
| 40 min | 4,100 | 4,150 |
| 60 min | 4,125 | 4,175 |
| Elongation at break: | | |
| 20 min | 510 | 550 |
| 40 min | 530 | 530 |
| 60 min | 510 | 520 |

PROPERTIES AFTER 2-DAY AGING AT 212° F.

| 300% Modulus: | | |
|---|---|---|
| 20 min | 2,275 | 2,175 |
| 40 min | 2,400 | 2,200 |
| 60 min | 2,425 | 2,125 |
| Tensile at break: | | |
| 20 min | 2,700 | 2,700 |
| 40 min | 2,775 | 2,350 |
| 60 min | 2,600 | 2,125 |
| Elongation at break: | | |
| 20 min | 360 | 370 |
| 40 min | 350 | 310 |
| 60 min | 320 | 280 |

PROPERTIES AFTER 96 HRS. IN BOMB AT 70° C.

| 300% Modulus: | | |
|---|---|---|
| 20 min | 875 | 900 |
| 40 min | 1,475 | 1,375 |
| 60 min | 1,650 | 1,475 |
| 400% Modulus: | | |
| 20 min | 1,400 | 1,450 |
| 40 min | 2,050 | 1,950 |
| 60 min | 2,200 | 2,050 |
| Tensile at break: | | |
| 20 min | 1,800 | 2,000 |
| 40 min | 2,375 | 2,400 |
| 60 min | 2,475 | 2,325 |
| Elongation at break: | | |
| 20 min | 500 | 510 |
| 40 min | 470 | 510 |
| 60 min | 450 | 460 |

In Table B likewise, it is seen that the solid product compares favorably in antioxidant properties with the excellent liquid antioxidant from which it is derived, and it has the other advantages incident to its being a solid instead of a liquid.

Table C gives data on the use of the $C_{12}$-derivatives, prepared with and without caustic and identified in Tables I and II as products II and V.

TABLE C

| Formula (Parts by weight) | Control | Sample No. 5 | Sample No. 6 |
|---|---|---|---|
| Masterbatch No. 1 | 159.6 | 159.6 | 159.6 |
| Sulfur | 2.6 | 2.6 | 2.6 |
| Accelerator | 0.5 | 0.5 | 0.5 |
| 6-$C_{12}$ATDHQ | 1.5 | 0.0 | 0.0 |
| Product II | 0.0 | 1.5 | 0.0 |
| Product V | 0.0 | 0.0 | 1.5 |
| Total | 166.2 | 166.2 | 166.2 |

NORMAL PROPERTIES

| 300% Modulus: | | | |
|---|---|---|---|
| 20 min | 950 | 1,100 | 1,250 |
| 40 min | 1,725 | 1,750 | 1,900 |
| 60 min | 1,875 | 2,000 | 2,100 |
| 400% Modulus: | | | |
| 20 min | 1,475 | 1,900 | 2,025 |
| 40 min | 2,725 | 2,750 | 2,850 |
| 60 min | 2,850 | 3,025 | 3,100 |
| Tensile at break: | | | |
| 20 min | 2,550 | 2,975 | 3,400 |
| 40 min | 3,950 | 4,050 | 4,300 |
| 60 min | 3,975 | 4,150 | 4,225 |
| Elongation at break: | | | |
| 20 min | 570 | 540 | 580 |
| 40 min | 540 | 540 | 550 |
| 60 min | 520 | 530 | 530 |

PROPERTIES AFTER 2-DAY AGING AT 212° F.

| 300% Modulus: | | | |
|---|---|---|---|
| 20 min | 2,025 | 2,050 | 2,050 |
| 40 min | 2,150 | 2,200 | 2,250 |
| 60 min | 2,200 | 2,250 | 2,150 |
| 400% Modulus: | | | |
| 20 min | | | |
| 40 min | | | |
| 60 min | | | 2,750 |
| Tensile at break: | | | |
| 20 min | 2,700 | 2,825 | 2,850 |
| 40 min | 2,800 | 2,800 | 2,400 |
| 60 min | 2,675 | 2,600 | 2,225 |
| Elongation at break: | | | |
| 20 min | 400 | 400 | 420 |
| 40 min | 400 | 380 | 310 |
| 60 min | 360 | 350 | 310 |

PROPERTIES AFTER 96 HRS. IN BOMB AT 70° C.

| 300% Modulus: | | | |
|---|---|---|---|
| 20 min | 675 | 775 | 950 |
| 40 min | 1,350 | 1,300 | 1,475 |
| 60 min | 1,500 | 1,475 | 1,575 |
| 400% Modulus: | | | |
| 20 min | 1,100 | 1,225 | 1,475 |
| 40 min | 1,900 | 1,900 | 2,100 |
| 60 min | 2,025 | 2,000 | 2,150 |
| Tensile at break: | | | |
| 20 min | 1,600 | 1,775 | 2,075 |
| 40 min | 2,525 | 2,450 | 2,500 |
| 60 min | 2,325 | 2,375 | 2,400 |
| Elongation at break: | | | |
| 20 min | 520 | 520 | 510 |
| 40 min | 510 | 510 | 480 |
| 60 min | 460 | 470 | 460 |

The various tables, including Table C, show that the desirable solid products are quite equal in antioxidant value to the liquids from which they are derived. These liquids are recognized as being excellent antioxidants, but have been little used because they are liquid.

The foregoing examples and results are illustrative. Different reaction products may be used with different rubbers in different formulae. From 0.1 to 10 percent of the antioxidant will be used, based on the weight of the rubber polymer.

Crosslinked rubber is a rubber made less soluble, less thermoplastic and more elastic by crosslinking. Crosslinking includes vulcanization or curing of a rubber, and can be accomplished by any known crosslinking agent or method. A rubber can be crosslinked by heating it with sulfur or a sulfur-bering curing agent, preferably in the presence of a suitable accelerator, and this process is well known in the rubber art as sulfur vulcanization. Other curing agents such as selenium or tellurium can be used in conjunction with or replacing sulfur.

A different class of curing agents for rubbers includes the well known di- or poly-nitroso compounds, quinone oximes and anils, di- and poly-nitro compounds, bis- and poly-azo compounds, diazoamino compounds, and various organic peroxides, including dicumyl peroxide, for example. The rubber is usually heated with the curing agent to effect the desired crosslinking, as is known in the art. This type of curing agent can be accelerated by lead oxides, for example red lead ($Pb_3O_4$), quinone dianils, substituted phenylenediamines, etc., as is known in the art.

Rubbers are cured also by heating admixed with a curable resin, such as a phenol-aldehyde resol or even the monomeric dimethylol- or polymethylol-phenol. The phenol is advantageously nuclearly substituted by a hydrocarbon radical. An example of this type of curing agent is the resol formed by condensing a molar excess of formaldehyde with p-tt-octylphenol in the presence of an alkaline catalyst.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e.g. N - cyclohexyl - 2 - benzothiazolesulfenamide, thiazoline sulfenamides, thiocarbamyl sulfenamides, mercaptothiazoles, mercaptothiazolines, thiazolyl mono- and di-sulfides, the N,N-dialkyldithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometime desirable in a single rubber compound. Many of the accelerators mentioned above are suitable in latex formulations, especially such common accelerators as piperidinium pentamethylene-dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization of a suitably activated rubber composition does take place at lower temperatures such as at room temperature. For example, a latex film containing a sulfur-curing agent and an activated ultra accelerator can be cured by allowing the film to remain at room temperature for several hours or a few days.

The invention is covered in the claims which follow.

What I claim is:

1. The method of producing a monosulfide reaction product which comprises reacting substantially 1 to 4 moles of $SCl_2$ with 2 moles of a 6-alkyl-2,2,4-trimethyl-1,2-dihydroquinole in solution in an inert solvent at a temperature between substantially 50 and 70° C., the alkyl substituent containing 6 to substantially 20 carbon atoms.

2. The method of producing a monosulfide reaction product which comprises reacting substantially 1 to 4 moles of $SCl_2$ with 2 moles of a 6-alkyl-2,2,4-trimethyl-1,2 hydroquinoline and neutralizing hydrogen chloride produced in the reaction by an aqueous neutralizing agent; the alkyl substituent containing 6 to substantially 20 carbon atoms.

3. The friable reaction products of $SCl_2$ and a 6-alkyl-2,2,4-trimethyl-1,2-dihydroquinolines in which the alkyl substituent contains 6 to substantially 20 carbon atoms.

4. The friable reaction products of claim 3 in which the alkyl substituent contains an average of substantially six carbon atoms.

5. The friable reaction products of claim 3 in which the alkyl substituent contains an average of substantially twelve carbon atoms.

6. The friable reaction products of claim 3 in which the alkyl substituent contains an average of substantially eighteen carbon atoms.

7. The process of treating rubber which comprises cross-linking a diene rubber in the presence of an antioxidizing amount of the reaction product of claim 3.

8. The process of treating rubber which comprises heating a diene rubber with a cross-linking agent in the presence of an antioxidizing amount of the reaction product of claim 3.

9. The process of treating rubber which comprises heating a diene rubber with a cross-linking agent in the presence of an antioxidizing amount of the reaction product of claim 3 in which the alkyl substituent contains an average of substantially six carbon atoms.

10. The process of treating rubber which comprises heating a diene rubber with a cross-linking agent in the presence of an antioxidizing amount of the reaction product of claim 3 in which the alkyl substituent contains an average of substantially twelve carbon atoms.

11. The process of treating rubber which comprises heating a diene rubber with a cross-linking agent in the presence of an antioxidizing amount of the reaction product of claim 3 in which the alkyl substituent contains an average of substantially eighteen carbon atoms.

12. Cross-linked diene rubber which contains the reaction product of claim 3.

13. Cross-linked diene rubber which contains the reaction product of claim 3 in which the alkyl substituent contains an average of substantially six carbon atoms.

14. Cross-linked diene rubber which contains the reaction product of claim 3 in which the alkyl substituent contains an average of substantially twelve carbon atoms.

15. Cross-linked diene rubber which contains the reaction product of claim 3 in which the substituents are alkyl groups which contain an average of substantially eighteen carbon atoms.

References Cited in the file of this patent

UNITED STATES PATENTS 2,892,805     Tomlin et al. _____ June 30, 1959